(12) United States Patent
Novoselsky

(10) Patent No.: US 7,774,700 B2
(45) Date of Patent: Aug. 10, 2010

(54) PARTIAL EVALUATION OF XML QUERIES FOR PROGRAM ANALYSIS

(75) Inventor: Anguel Novoselsky, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1067 days.

(21) Appl. No.: 11/471,743

(22) Filed: Jun. 20, 2006

(65) Prior Publication Data
US 2007/0294678 A1 Dec. 20, 2007

(51) Int. Cl.
G06F 17/27 (2006.01)
G06F 9/45 (2006.01)

(52) U.S. Cl. .................. 715/236; 717/136; 715/235

(58) Field of Classification Search .............. 715/236, 715/235; 717/136
See application file for complete search history.

(56) References Cited

U.S. PATENT DOCUMENTS

| | | | |
|---|---|---|---|
| 6,785,673 B1 | 8/2004 | Fernandez et al. | |
| 2002/0143727 A1 | 10/2002 | Hu et al. | |
| 2004/0015783 A1 | 1/2004 | Lennon et al. | |
| 2004/0044965 A1* | 3/2004 | Toyama et al. | 715/523 |
| 2004/0163041 A1 | 8/2004 | Engel | |
| 2004/0199905 A1 | 10/2004 | Fagin et al. | |
| 2004/0216030 A1 | 10/2004 | Hellman et al. | |
| 2005/0055355 A1* | 3/2005 | Murthy et al. | 707/100 |
| 2005/0246159 A1* | 11/2005 | Perla et al. | 704/8 |
| 2005/0262491 A1* | 11/2005 | Gu | 717/151 |
| 2005/0273772 A1* | 12/2005 | Matsakis et al. | 717/136 |
| 2006/0085451 A1* | 4/2006 | Pal et al. | 707/100 |
| 2006/0242563 A1 | 10/2006 | Liu et al. | |

OTHER PUBLICATIONS

Sushant Jain et al., "Translating XSLT Programs to Efficient SQL Queries", Int'l WWW Conf., Proceedings of the 11th Int'l Conf. on WWW, Session: Query Language for Semantic Web, Published: 2002, pp. 616-626.*

Fokoue et al., "Compiling XSLT 2.0 into XQuery 1.0", Int'l WWW Conf., Proceedings of the 14th Int'l Conf. on WWW, Published: 2005, pp. 682-691.*

(Continued)

*Primary Examiner*—Adam L Basehoar
*Assistant Examiner*—Yasin Patterson
(74) *Attorney, Agent, or Firm*—Hickman Palermo Truong & Becker LLP; Daniel D. Ledesma

(57) ABSTRACT

A method and apparatus is provided for partial evaluation of XML queries for program analysis. An executable version of a first body of instructions that conforms to an XML computer language, such as XSLT, is generated. The executable version may include trace instructions for collecting information about executing the executable version against representative data, such as an XML schema document. This execution causes the generation of an execution graph, which may be optimized by the collected information. Based on the execution graph, a second body of instructions is generated that conforms to a different computer language, such as XQuery. Subsequently, the second body of instructions may be applied against XML documents that conform to the same schema as the representative data. By generating the second body of instructions before source XML documents are received, several optimizations may be made that greatly decrease the time for querying and/or transforming XML documents.

32 Claims, 5 Drawing Sheets

OTHER PUBLICATIONS

W3C, "XML Schema Part 1: Structures, Second Edition", http://www.w3.org/TR/2004/REC-xmlschema-1-20041028/structures.html#intro-purpose.*

Simeon et al., "The Essence of XML", Annual Symposium on Principles of Programming Languages, Proceedings of the 30th ACM SIGPLAN-SIGACT Symposium on Principles of Programming Languages, Published: 2003, pp. 1-13.*

Lee et al., "CPI: Constraints-Preserving Inlining Algorithm for Mapping XML DTD to Relational Schema", Data & Knowledge Engineering, vol. 39, Issue 1, Published: Oct. 2001, pp. 3-25.*

Shanmugasundaram et al., "Relational Databases for Querying XML Documents: Limitations and Opportunities", Proceedings of the 25th VLDB Conf., Published: 1999, pp. 302-314.*

Liu et al., "Query Translation from XSLT to SQL", Database Engineering and Applications Symposium 2003, Published: Jul. 16-18, 2003, pp. 87-96.*

N.D. Jones et al., Partial Evaluation and Automatic Program Generation, Prentice Hall Int'l, Jun. 1993.*

Jones, D., "Translating C to Ada", Knowledge Software Ltd. (1995) pp. 1-9.

Kennedy, K. et al., "Applications of a Graph Grammar For Program Control Flow Analaysis", Dept. of Mathematical Sciences, Rice University, pp. 72-85.

Sklansky, J. et al., "A Formalism for Program Translation", Journal of the Association for Computing Machinery, vol. 15 (1968) 11 pages.

Van Den Bosch, P., "The translation of programming languages through the time of a graph transformation language" Department of Computer Science, The University of British Columbia, pp. 83-92.

W3C, XSL Transformations (XSLT) Version 1.0, Recommendation Nov. 16, 1999, Ch. 1, 5.8, 6, 7.1.2, 7.1.3, 7.3, 7.4, 7.2, 9.2, 5.6, 10, 11.4, 11.5.

U.S. Appl. No. 11/728,650, filed Mar. 26, 2007, Final Office Action, mailed Jan. 28, 2010.

* cited by examiner

--PRIOR ART--

PARTIAL EVALUATION OF XML QUERIES FOR PROGRAM ANALYSIS

CROSS-REFERENCE TO RELATED APPLICATION

This application is related to U.S. patent application Ser. No. 11/261,684 filed on Oct. 28, 2005, entitled "Optimizing XSLT Based On Input XML Document Structure Description and Translating XSLT Into Equivalent XQuery Expressions", the entire contents of which are incorporated by this reference for all purposes as if fully disclosed herein.

FIELD OF THE INVENTION

The present invention relates to processing XML documents, and more particularly to performing partial evaluation of sample XML documents for analyzing programs that process XML documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

XML is a versatile markup language, capable of labeling the information content of diverse data sources including structured and semi-structured documents, relational databases, and object repositories. A query language that uses the structure of XML intelligently can express queries across all these kinds of data, whether physically stored in XML or viewed as XML via middleware. As increasing amounts of information are stored, exchanged, and presented using XML, the ability to intelligently query XML data sources becomes increasingly important. One of the great strengths of XML is its flexibility in representing many different kinds of information from diverse sources. To exploit this flexibility, an XML query language must provide features for retrieving and interpreting information from these diverse sources.

Embodiments of the invention are described in the context of two of the most common XML query languages (i.e. XSLT and XQuery). However, embodiments of the invention are not limited to XSLT and XQuery described herein.

THE XSLT TRANSFORMATION LANGUAGE

The XSLT language is described in "XSL Transformations (XSLT) Version 1.0, W3C Recommendation 16 Nov. 1999" available from the W3C organization; the entire contents of which are incorporated by this reference for all purposes as if fully disclosed herein. XSLT is a language for transforming XML documents into other XML documents or other markup language documents (e.g., HTML). XSLT is designed for use as part of XSL, which is a stylesheet language for XML. In addition to XSLT, XSL includes an XML vocabulary for specifying formatting. XSL specifies the styling of an XML document by using XSLT to describe how the document is transformed into another document that uses the formatting vocabulary. XSLT is also designed for use independently of XSL.

A transformation in the XSLT language is expressed as a well-formed XML document. A transformation expressed in XSLT describes rules for transforming a source tree into a result tree. The transformation is achieved by associating patterns with templates. A pattern is matched against nodes in the source tree. A template is instantiated to create part of the result tree. The result tree is separate from the source tree and the structure of the result tree can be completely different from the structure of the source tree. In constructing the result tree, nodes from the source tree can be filtered and reordered, and arbitrary structure can be added.

A transformation expressed in XSLT is called a stylesheet because, in the case when XSLT is transforming into the XSL formatting vocabulary, the transformation functions as a stylesheet. A stylesheet contains a set of template rules. A template rule has two parts: (1) a pattern which is matched against nodes in the source tree, and (2) a template which can be instantiated to form part of the result tree. This allows a stylesheet to be applicable to a wide class of documents that have similar source tree structures.

A template is instantiated for a particular source node to create part of the result tree. A template can contain elements that specify literal result element structure. A template can also contain elements from the XSLT namespace that are instructions for creating result tree fragments. When a template is instantiated, each instruction is executed and replaced by the result tree fragment that it creates. Instructions can select and process descendant source nodes. Processing a descendant node creates a result tree fragment by finding the applicable template rule and instantiating its template. Note that nodes are only processed when they have been selected by the execution of an instruction. The result tree is constructed by finding the template rule for the root node and instantiating its template.

THE XQUERY QUERY LANGUAGE

The XQuery language is described in "XQuery 1.0: An XML Query Language, W3C Working Draft 4 Apr. 2005" available from the W3C organization; the entire contents of which are incorporated by this reference for all purposes as if fully disclosed herein. XQuery is designed to be a language in which queries are concise and easily understood. XQuery is also flexible enough to query a broad spectrum of XML information sources, including both databases and documents. XQuery operates on the abstract, logical structure (i.e., the data model) of an XML document, rather than its surface syntax. Note that an XQuery expression comprises one or more expressions (i.e., sub-expressions).

XSLT and XQuery share the same XPath as a common core. Additionally, both languages have constructs to construct new nodes in an XML result tree, provide constructs for iterations, conditional testing, allow read-only variables usage (functional language without assignment semantics), support user defined functions, etc. A significant difference between the two languages is that XSLT has the powerful template rule matching driven style of execution, which XQuery does not have. In this sense, XSLT is even more declarative than XQuery as it does not require programmers to state procedurally how each template is applied.

However, the declarative nature of XSLT stylesheets is at the expense of performing what is often a complex template matching routine. This runtime matching routine is required because of the lack of advance knowledge about the input content and, therefore, which particular templates are most appropriate and should be invoked to transform the input content. Furthermore, sequential languages such as XQuery are more computationally efficient than template-matching driven languages such as XSLT because a processor executing a sequence of instructions in the sequential language simply knows what to do, without having to perform rule-based matching to determine what to do.

One approach to transforming XML data based on an XSLT stylesheet, in the context of a relational database system, is referred to as functional evaluation. FIG. 1 is a block diagram that illustrates a functional evaluation process flow for an XSLT transformation request 102. Functional evaluation of XSLT transformation request 102, in view of the XML input data and the particular XSLT stylesheet specified in request 102 (e.g., an xmltransform( ) operator), generally involves the following runtime steps: (a) constructing a structured XML document 106 from the XML data storage layer (e.g., if the XML data is shredded and stored in relational and/or object-relational tables of a relational database management system (RDBMS), then the actual construction of the XML document from relational or object-relational tables is required); (b) materializing XML document 106 into a DOM-like (document object model) structure, which is a tree-like structure used to represent the structure of the data; (c) calling into an XSLT engine 108 to apply an XSLT stylesheet 107 and its associated set of transformation templates to the input DOM, which includes performing the template matching routine; (d) generating a new DOM that represents the transformed XML data; and (e) re-mapping the transformed data into new layouts or table structures (i.e., table translation), via a DOM interface 109 and RDBMS engine 104. This conceptual functional evaluation of XMLTransform( ) with XSLT style sheet is expensive because XML data needs to be constructed from various pieces from different storage tables and then passed to a standalone XSLT engine. Based on the foregoing, there is a need for a more efficient process for transforming, e.g. via XSLT stylesheets, XML data stored in a relational database system. U.S. patent application Ser. No. 11/261,684 describes one technique for rewriting, at compile time, XSLT stylesheets into a set of XQuery expressions that can be "pushed down" into a database (i.e. translate expressions into relational constructs that the database "understands").

Furthermore, existing processors do not compile XSLT into a sequence of events because compilers do not "know" in advance what sequence of actions will occur during execution. In this sense, languages built on a rule-based paradigm are nondeterministic. Traditionally, in order to compile a source program that conforms to a non-rule-based language, the statements specified therein are analyzed and compiled into a different, but semanitically-equivalent language that an execution engine can execute. In order to do so, a compiler performs data flow and control flow analysis by producing an execution graph based the source program. The compiler analyzes, node by node in the execution graph, the result of executing each node if the statement corresponding to the node is executed at runtime. The execution graph is thus a symbolic representation of the actual execution engine that will execute the source program. For rule-based languages such as XSLT, such an approach to analyzing programs based on the language is difficult, if not impossible, to apply because of their non-deterministic nature.

Additionally, building a new execution engine (via an execution graph) for each XML query that is received consumes a considerable amount of resources. Thus, based on the foregoing, there is a need for a better technique for compiling XML queries that process XML documents.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Figure 1:
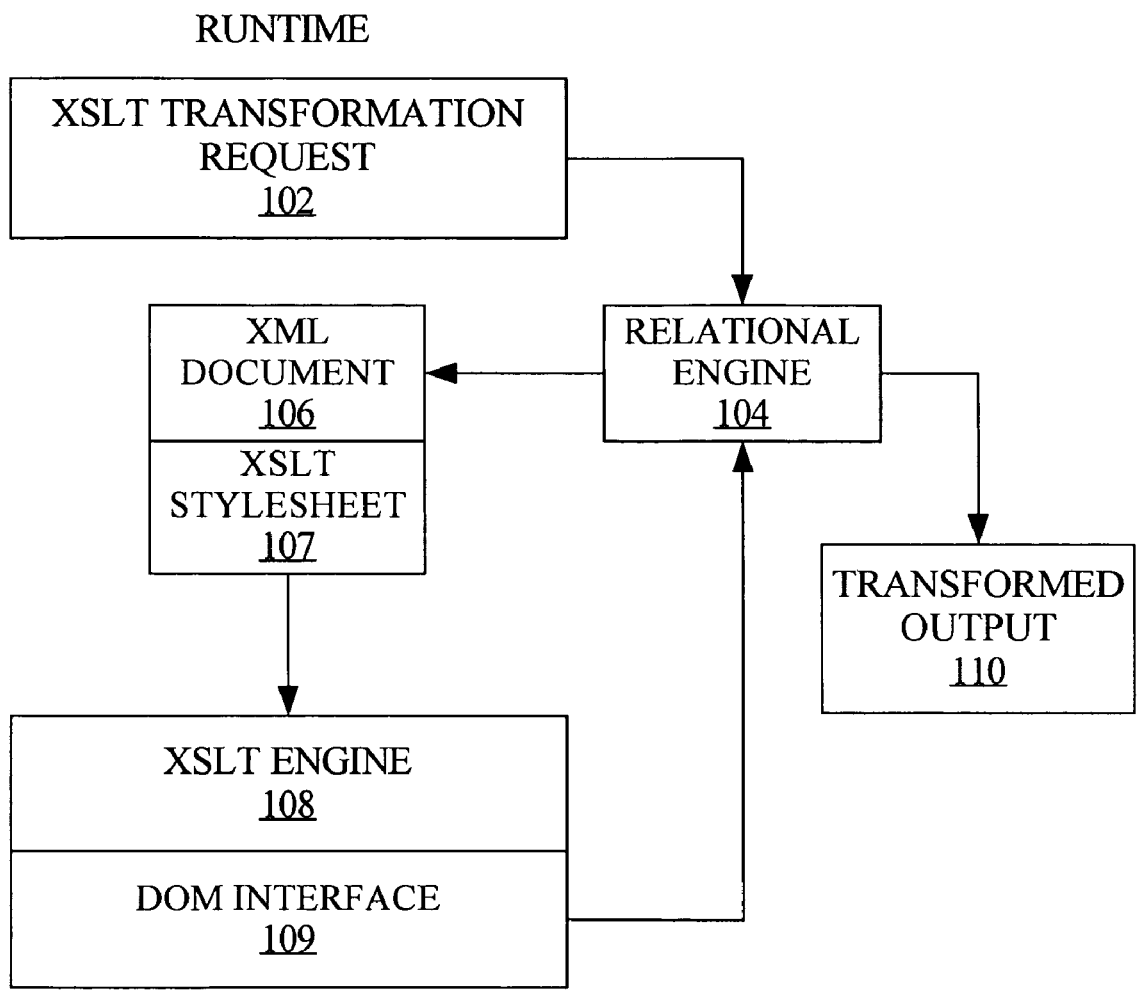
FIG. 1 is a block diagram that illustrates a functional evaluation process flow for an XSLT transformation request.
Figure 2:
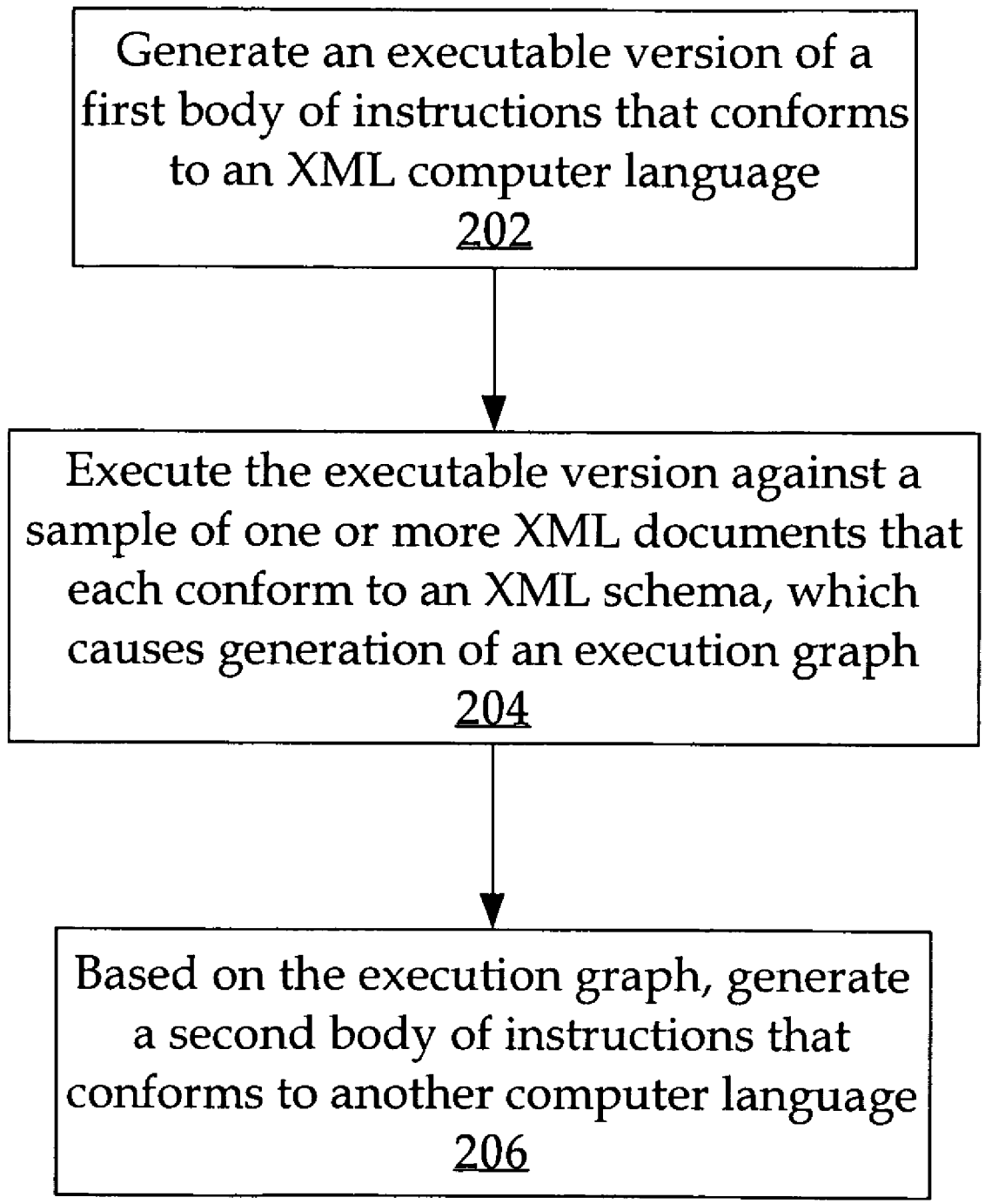
FIG. 2 is a flow diagram that illustrates a method for partially evaluating an XML query for program analysis, according to an embodiment of the invention.

FIG. 2 is a flow diagram that illustrates a method for partially evaluating an XML query for program analysis, according to an embodiment of the invention. At step 202, an executable version is generated of an XML query comprising a first body of instructions that conforms to an XML computer language. At step 204, the executable version is executed against a sample of one or more XML documents that each conform to an XML schema. This execution causes the generation of an execution graph. The executable version may include trace instructions that are used, during the execution against the sample of documents, to collect information about the execution, which may be used to optimize the execution graph. At step 206, based on the execution graph, a second body of instructions is generated that conforms on another computer language.

Partial Evaluation of an XML Query

Part of the rationale for partial evaluation of an XML query derives from the fact that a user knows in advance the structure of XML documents that a body of instructions (e.g. XLST instructions) will process and/or is designed to process. Thus, a user knows in advance the XML schema to which the XML documents conform before transformations and queries on the XML documents are executed.

For example, suppose that on a weekly basis party P1 sends party P2 purchase order documents that conform to schema s1. P2 possesses XML processors that analyze only purchase order documents that conform to schema s2. Therefore, each time P2 receives purchase order documents from P1, P2 desires to transform them into XML documents that conform to schema s2. Based on this knowledge, P2 will execute, on a weekly basis, the same transformation request of transforming the purchase order documents from P1 into purchase order documents that conform to schema s2. Additionally, P2 will execute the same queries against the transformed purchase order document to access pertinent information therein.

In order to maximize this knowledge of the XML schema and the body of instructions before XML documents are received, queries that target XML documents are partially evaluated against a representative set of data. Representative data may be a sample XML document that includes all, or almost all, variations that a particular body of instructions is expected or designed to handle. Thus, representative data should not only conform to the same XML schema to which source XML documents conform, but should also be chosen such that most, if not all, instructions in the first body of instructions will be executed.

Figure 3:
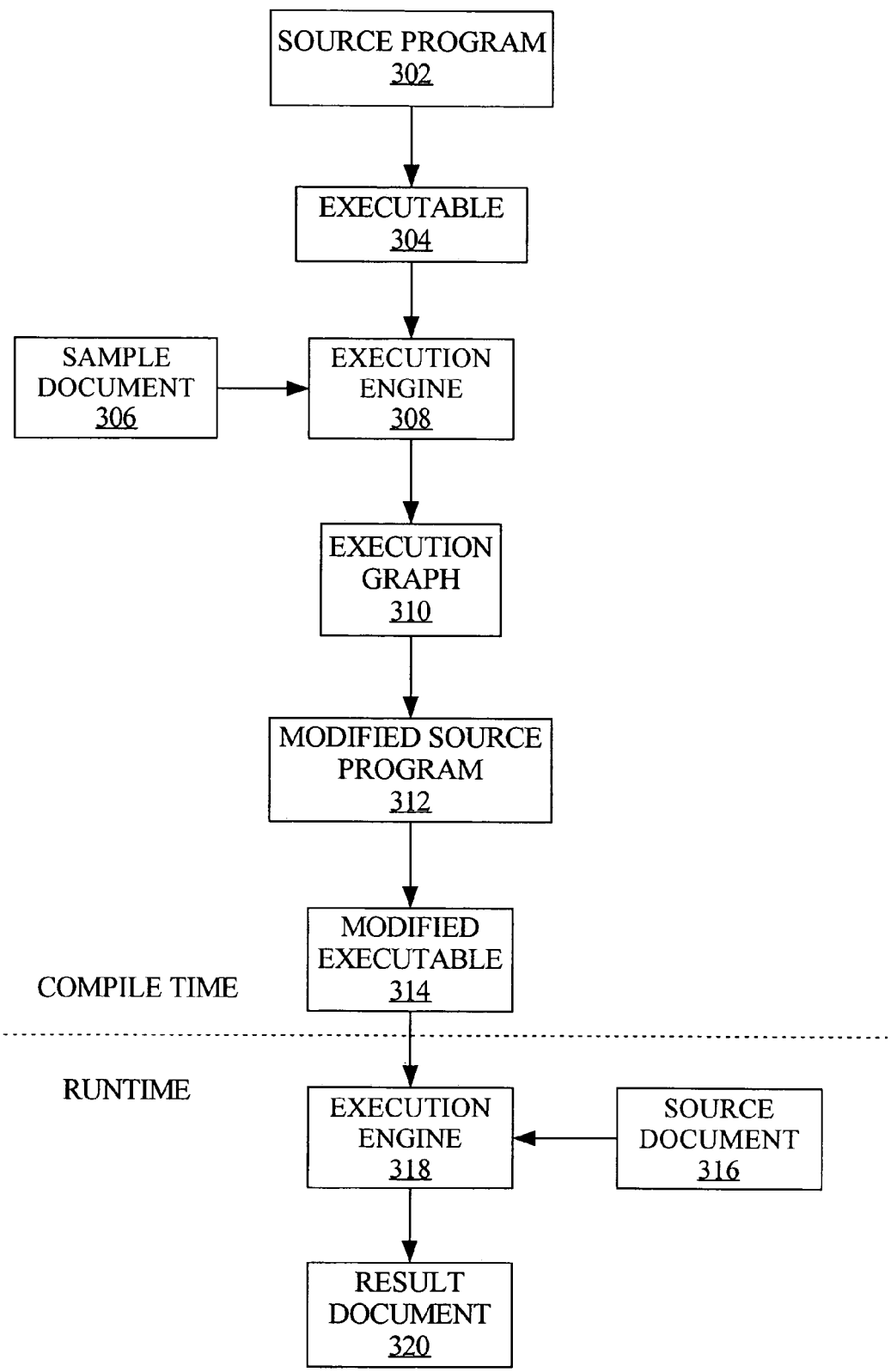
FIG. 3 is a block diagram that illustrates steps for executing an XML query (e.g. transformation request) using partial evaluation, according to an embodiment of the invention.

FIG. 3 is a block diagram that illustrates steps for executing an XML query (e.g. transformation request) using partial evaluation, according to an embodiment of the invention. Source program 302 comprises a first body of instructions that conforms to an XML computer language. The XML computer language may be a rule-based language, such as XSLT, or it may be any other XML computer language, such as XQuery. Therefore, source program 302 is not restricted to being only a transformation request, but may instead (or also) specify what information to extract from a source document 316.

Executable 304 is the executable version of source program 302 that is used to execute against XML documents, such as sample document 306. Executable version 304 may include trace instructions that are used to collect information during the execution of sample document 306. The information that is collected may be used to 1) determine the flow of execution of executing source program 302 against sample document 306, 2) assist in generating an execution graph, and 3) further optimize the execution graph. The collected information may include 1) the datatypes of the various XML nodes specified in the first body of instructions (i.e. static type checking so that the execution engine that executes a target XML document does not have to perform type checking), 2) what order the first body of instructions will be executed, 3) whether certain instructions of the first body of instructions will ever be executed, and 4) possible XML nodes to be executed at each "traced" execution step, so that the graph optimization takes advantage not only of node types but also of node structural information (e.g. node subtrees).

Sample document 306 may be an XML schema document, such as an XML Schema document, a Document Type Definition (DTD) document, or a Document Structure Description (DSD) document. Sample document 306 is typically a document that is converted from an XML schema document and may contain special attributes to describe XML tree structural variants. For example, the structural variant "choice" (in XMLSchema) or "|" (in DTD) which indicates that only one of the following XML nodes will appear in the instance document. The structural variant "all" (in XMLSchema) indicates that all of the following XML nodes will appear in the instance document in any order. The structural variant "sequence" (in XMLSchema) or "," (in DTD) indicates that the following XML nodes will appear in the instance XML document in the same order. The structural variant "optional" indicates that the following XML nodes may or may not appear in the instance XML documents.

Alternatively, sample document 306 may be an XML schema instance that includes all, or almost all, possible structure and type of content that a particular body of instructions is expected or designed to handle. Sample document 306 may also represent multiple sample XML documents that conform to the same XML schema, in which case the multiple sample XML documents together includes all, or almost all, possible structure and type of content that a particular body of instructions is expected or designed to handle.

Execution engine 308 accepts as input executable 304 and sample document 306 and generates an execution graph 310. Execution graph 310 may comprise of nodes and arcs where each node represents an execution state and an arc represents the flow of execution. A node, for example, may correspond to a single instruction from the first body of instructions, such as a rule and a corresponding template to apply if the rule applies.

Optimizing the Execution Graph

The data resulting from the trace instructions in executable 304 are used to optimize source program 302. Thus, execution graph 310 represents an optimized version of source program 302. Execution graph 310 contains nodes (e.g. instructions) that are to be executed at runtime. One type of optimization that may be made is ignoring one or more instructions in source program 302 if certain statements, according to sample document 306, will never be executed. For example, suppose the first body of instructions of source program 302 includes an if-then-else conditional and the condition will never be false, which means the else statement will never be executed. Then, execution graph 310 will not include a node (i.e. execution state) that represents that statement and a branch to that node (i.e. arc).

In some cases, an instruction in the first body of instructions may be data-specific. For example, a rule in an XSLT stylesheet may state that a purchase order element in an XML document should be deleted if the price of the corresponding purchase order is less than $100. A compiler does not know in advance the value of purchase order price nodes in the XML document. Thus, in such data-specific conditional statements, the compiler is configured to maintain both branches. However, the compiler does know, based on the purchase order schema known in advance, the structure of the XML document and thus what nodes in the XML document satisfy non-data-specific rules. An example of a non-data-specific rule is one that modifies the name of an element or attribute in the XML document regardless of the value of the element or attribute.

Figure 4:
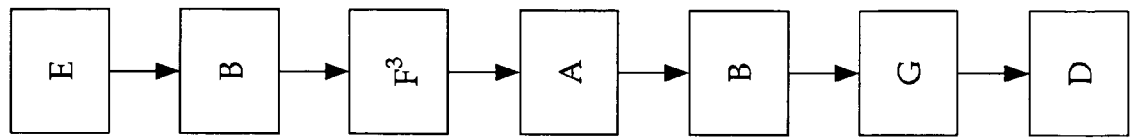
FIG. 4 is a block diagram that illustrates execution graphs that are optimized for generating a modified source program that is executed against a source document, according to an embodiment of the invention.
Figure 4:
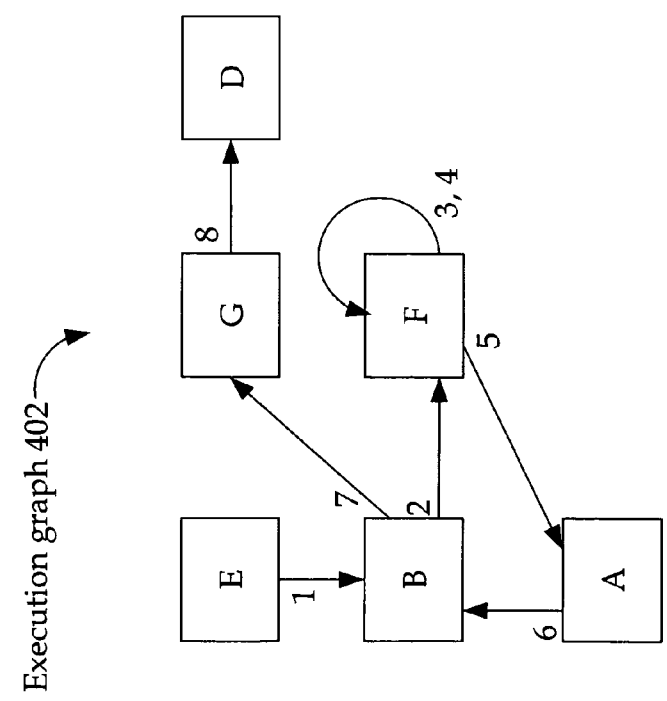

FIG. 4 is a block diagram that illustrates example execution graphs 402 and 404 that are optimized for generating a modified source program (e.g. modified source program 312) that may be eventually executed against a source document (e.g. source document 316), according to an embodiment of the invention. Suppose source program 302 comprises an XSLT stylesheet that specifies seven rules—rules A-G. After execution engine 308 executes executable 304 against sample document 306, execution graph 402 of FIG. 4 is generated. Each node in execution graph 402 corresponds to a rule from source program 302 and each arc corresponds to the flow of execution, where an adjacent number to an arc indicates the order in which the rules are executed. Thus, based on execution graph 402, rule E is executed first, then rule B, followed by rule F (which is executed three times), and so forth. Note that execution engine 308 did not generate a node corresponding to rule C, indicating 1) that rule C was not executed against sample document 306 and 2) that, therefore, rule C would not be executed against source document 316.

Another type of optimization that may be applied to execution graph 310 is inlining all the nodes and removing as many loops in execution graph 310 as possible. An example of inlining is replacing a function call with the actual body of the function. Logically, only nodes of execution graph 310 that are determined to be executed are inlined.

FIG. 4 provides an example of inlining execution graph 402 that results in execution graph 404 where all loops are removed and every node is inlined. For sake of simplicity, instead of generating three nodes for rule F, a superscript is used to indicate that rule F is executed three times. Note that an extra node for rule B is generated and inserted in the proper place according to the flow of execution indicated by execution graph 402. By removing function calls and jumps in execution, execution graph 404 may be executed much faster than execution graph 402.

Another type of optimization that may be applied is determining that one or more indexes may be used to apply some of the steps indicated by nodes in execution graph 310 to source document 316. Then, at runtime when source document 316 is transformed by execution engine 318, execution engine 318 may access the one or more indexes to perform the transformations, which may result in significant decreases in execution time.

Partial Evaluation (Cont.)

Based on execution graph 310, a modified source program 312 is generated that comprises a second body of instructions that conforms to another computer language. The other computer language may be an XML computer language, such as XQuery, or a non-XML computer language, such as Java and C++. The second body of instructions indicates a sequential order of execution, as opposed to the first body of instructions which may not have been sequential, such as in the case of rules defined in an XSLT stylesheet. In one embodiment, the second body of instructions conforms to a particular computer language that may be further optimized by a compiler for the particular computer language before the second body of instructions is executed against source document 316.

Modified executable 314 is the executable version of modified source program 312 that is used to execute against XML documents, such as source document 316.

As FIG. 3 indicates, the steps described thus far occur at compile time which allows for static type checking and optimizations to be made. Consequently, executing modified executable 314 at runtime is much faster than applying executable 304 directly against actual XML documents because the execution engine would have had to perform dynamic typing and such optimizations would not have been made.

Execution engine 318 accepts as input modified executable 314 and source document 316. Thus, sample document 306 is at least partially evaluated with executable 304, whereas source document 316 is (eventually) evaluated with modified executable 314. Execution engine generates result document 320 that reflects the query statements (e.g. transformations) specified in source program 302, except that the time to generate result document 320 may be significantly less, usually an order of magnitude less, than the time to execute executable 304 directly against source document 316.

In summary, partial evaluation of XML queries takes advantage of advanced knowledge of the schema of XML documents that are exchanged and the queries that are executed against those XML documents. Using trace instructions in generating execution graph 310 that is based on representative data (i.e. sample document 306) allows optimizations to be made, resulting in the generation of more efficient code (i.e. specified in modified source program 312).

Hardware Overview

Figure 5:
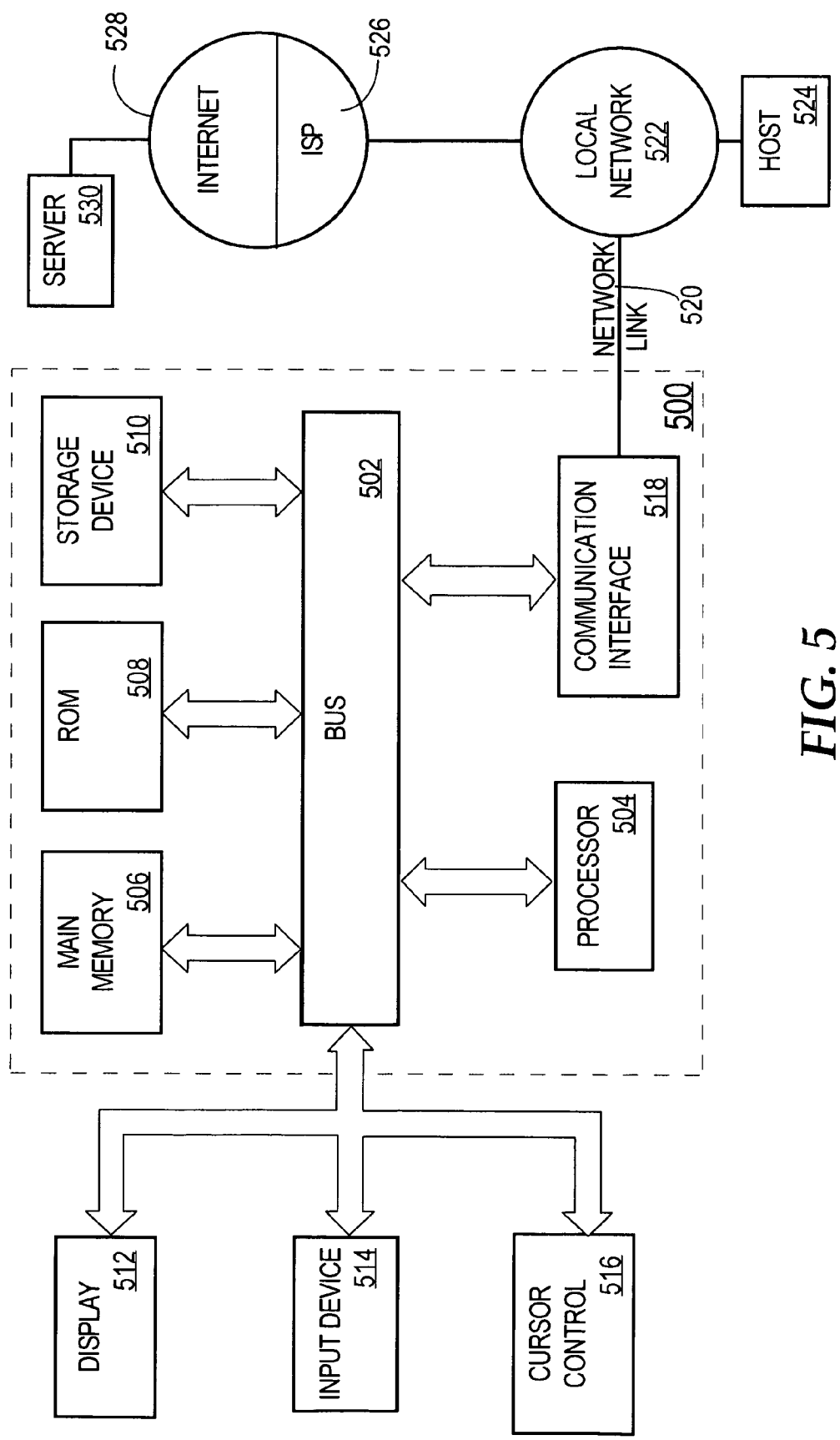
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving a first body of instructions that conform to a first XML computer language;
    generating a first executable version of the first body of instructions;
    executing said first executable version against a sample of one or more XML documents that each conform to an XML schema;
    wherein executing said first executable version causes generation of an execution graph that comprises a plurality of nodes that each corresponds to one or more instructions, in said first body of instructions, that were executed during the execution of said first executable version against said sample of one or more XML documents; and
    based on said execution graph, generating a second body of instructions that conforms to a second computer language and generating an executable version of the second body of instructions;
    wherein the method is performed by one or more computing devices.

2. The method of claim 1, wherein the first XML computer language is XSLT.

3. The method of claim 1, wherein the second computer language is XQuery.

4. The method of claim 1, wherein the first XML computer language and the second computer language are the same.

5. The method of claim 1, wherein the sample of one or more XML documents is an XML schema document.

6. The method of claim 1, wherein the sample of one or more XML documents is a single XML document that (a) conforms to the XML schema and (b) includes substantially all possible structure and type of content that the first body of instructions is designed to handle.

7. The method of claim 1, wherein the sample of one or more XML documents are multiple XML documents that (a) each conforms to the XML schema and (b) together include substantially all possible structure and type of content that the first body of instructions is designed to handle.

8. The method of claim 1, wherein the XML schema is based, at least in part, on one of the following schema languages: Data Type Definition, XML Schema, and Data Structure Description.

9. The method of claim 1, wherein said first executable version includes trace instructions, not included in the first body of instructions, for collecting information about the execution of the first executable version against the sample of one or more XML documents during the step of executing said first executable version against the sample of one or more XML documents.

10. The method of claim 9, further comprising using the collected information to generate said execution graph.

11. The method of claim 9, further comprising using the collected information to inline said execution graph to generate a modified version of said execution graph, wherein said modified version includes one or more nodes more than said execution graph.

12. The method of claim 9, further comprising using the collected information to determine that a portion of the first executable version that corresponds to one or more instructions in the first body of instructions is not executed when said first executable version is executed against said sample of one or more XML documents, wherein none of the second body of instructions corresponds to any of the one or more instructions.

13. The method of claim 9, further comprising using the collected information to determine that one or more indexes may be used to apply said second body of instructions to an XML document that conforms to said XML schema.

14. The method of claim 1, further comprising:
executing said executable version of said second body of instructions against a set of one or more input XML documents that each (a) conforms to said XML schema and (b) is different than each document in the sample of one or more XML documents.

15. The method of claim 1, wherein executing said first executable version against a sample of one or more XML documents includes determining whether each of the one or more instructions in the first body of instructions specifies one or more nodes with corresponding values.

16. The method of claim 1, wherein:
said execution graph further comprises a plurality of arcs;
each node in the plurality of nodes corresponds to an execution state;
each arc in the plurality of arcs connects two nodes of said plurality of nodes; and
each arc in the plurality of arcs corresponds to a statement that, when executed, initiates a transition from one connected node to the other connected node.

17. One or more non-volatile or volatile machine-readable media storing instructions which, when executed by one or more processors, cause:
receiving a first body of instructions that conform to a first XML computer language;
generating a first executable version of the first body of instructions;
executing said first executable version against a sample of one or more XML documents that each conform to an XML schema;
wherein executing said first executable version causes generation of an execution graph that comprises a plurality of nodes that each corresponds to one or more instructions, in said first body of instructions, that were executed during the execution of said first executable version against said sample of one or more XML documents; and
based on said execution graph, generating a second body of instructions that conforms to a second computer language and generating an executable version of the second body of instructions.

18. The one or more non-volatile or volatile machine-readable media of claim 17, wherein the first XML computer language is XSLT.

19. The one or more non-volatile or volatile machine-readable media of claim 17, wherein the second computer language is XQuery.

20. The one or more non-volatile or volatile machine-readable media of claim 17, wherein the first XML computer language and the second computer language are the same.

21. The one or more non-volatile or volatile machine-readable media of claim 17, wherein the sample of one or more XML documents is an XML schema document.

22. The one or more non-volatile or volatile machine-readable media of claim 17, wherein the sample of one or more XML documents is a single XML document that (a) conforms to the XML schema and (b) includes substantially all possible structure and type of content that the first body of instructions is designed to handle.

23. The one or more non-volatile or volatile machine-readable media of claim 17, wherein the sample of XML documents are multiple XML documents that (a) each conform to the XML schema and (b) together include substantially all possible structure and type of content that the first body of instructions is designed to handle.

24. The one or more non-volatile or volatile machine-readable media of claim 17, wherein the XML schema is based, at least in part, on one of the following schema languages: Data Type Definition, XML Schema, and Data Structure Description.

25. The one or more non-volatile or volatile machine-readable media of claim 17, wherein said first executable version includes trace instructions, not included in the first body of instructions, for collecting information about the execution of the first executable version against the sample of one or more XML documents during the step of executing said first executable version against the sample of one or more XML documents.

26. The one or more non-volatile or volatile machine-readable media of claim 25, wherein the instructions, when executed by the one or more processors, further cause using the collected information to generate said execution graph.

27. The one or more non-volatile or volatile machine-readable media of claim 25, wherein the instructions, when executed by the one or more processors, further cause using the collected information to inline said execution graph to generate a modified version of said execution graph, wherein said modified version includes one or more nodes more than said execution graph.

28. The one or more non-volatile or volatile machine-readable media of claim 25, wherein the instructions, when executed by the one or more processors, further cause using the collected information to determine that a portion of the first executable version that corresponds to one or more instructions in the first body of instructions is not executed when said first executable version is executed against said sample of one or more XML documents, wherein none of the second body of instructions corresponds to any of the one or more instructions.

29. The one or more non-volatile or volatile machine-readable media of claim 25, wherein the instructions, when executed by the one or more processors, further cause using the collected information to determine that one or more indexes may be used to apply said second body of instructions to an XML document that conforms to said XML schema.

30. The one or more non-volatile or volatile machine-readable media of claim 17, wherein the instructions, when executed by the one or more processors, further cause:
executing said executable version of said second body of instructions against a set of one or more input XML documents that each (a) conforms to said XML schema and (b) is different than each document in the sample of one or more XML documents.

31. The one or more non-volatile or volatile machine-readable media of claim 17, wherein executing said first executable version against a sample of one or more XML documents includes determining whether each of the one or more instructions in the first body of instructions specifies one or more nodes with corresponding values.

32. The one or more non-volatile or volatile machine-readable media of claim 17, wherein:

said execution graph further comprises a plurality of arcs;

each node in the plurality of nodes corresponds to an execution state;

each arc in the plurality of arcs connects two nodes of said plurality of nodes; and each arc in the plurality of arcs corresponds to a statement that, when executed, initiates a transition from one connected node to the other connected node.

* * * * *

UNITED STATES PATENT AND TRADEMARK OFFICE
CERTIFICATE OF CORRECTION

PATENT NO. : 7,774,700 B2   Page 1 of 1
APPLICATION NO. : 11/471743
DATED : August 10, 2010
INVENTOR(S) : Anguel Novoselsky It is certified that error appears in the above-identified patent and that said Letters Patent is hereby corrected as shown below:

Title Pg, Item (56)
On page 2, in column 2, under "Other Publications", line 7, delete "Analaysis" and insert -- Analysis --, therefor.

In column 3, line 31, delete "semanitically" and insert -- semantically --, therefor.

In column 3, line 54, delete "based the" and insert -- based on the --, therefor.

Signed and Sealed this
Tenth Day of May, 2011

David J. Kappos
*Director of the United States Patent and Trademark Office*